United States Patent [19]  [11] 4,335,230
Kolczynski et al.  [45] Jun. 15, 1982

[54] NOVEL COMPOSITIONS COMPRISING ASYMMETRICAL PEROXYDICARBONATES AND METHODS FOR THEIR USE

[75] Inventors: James R. Kolczynski, Clarence Center; Gerald A. Schultz, Lockport, both of N.Y.

[73] Assignee: Akzona Incorporated, Asheville, N.C.

[21] Appl. No.: 212,941

[22] Filed: Dec. 3, 1980

Related U.S. Application Data

[62] Division of Ser. No. 107,999, Dec. 26, 1979, Pat. No. 4,269,726.

[51] Int. Cl.³ ............................................. C08F 4/38
[52] U.S. Cl. ..................................................... 526/228
[58] Field of Search ........................................ 526/228

[56] References Cited

U.S. PATENT DOCUMENTS

| | | | |
|---|---|---|---|
| 3,312,678 | 4/1967 | Crano | 526/209 |
| 3,373,150 | 3/1968 | Pears et al. | 526/228 |
| 3,799,916 | 3/1974 | Langsam | 526/229 |
| 3,950,375 | 4/1976 | McKee et al. | 260/463 |
| 4,097,408 | 6/1978 | Sanchez | 526/228 |

OTHER PUBLICATIONS

F. Strain et al., J. Amer. Chem. Soc. vol. 72, pp. 1254–1263.

*Primary Examiner*—William F. Hamrock
*Assistant Examiner*—Peter F. Kulkosky
*Attorney, Agent, or Firm*—F. W. Young; Robert F. Green

[57] ABSTRACT

Compositions comprising asymmetrical peroxydicarbonates and their use in polymerizing ethylenically unsaturated monomers such as vinyl chloride and diethylene glycol bis (allyl carbonate) are disclosed.

4 Claims, No Drawings

NOVEL COMPOSITIONS COMPRISING ASYMMETRICAL PEROXYDICARBONATES AND METHODS FOR THEIR USE

This is a division, of application Ser. No. 107,999, filed Dec. 26, 1979 and now U.S. Pat. No. 4,269,726.

BACKGROUND OF THE INVENTION

This invention relates generally to polymerization initiators and more particularly to peroxydicarbonate compositions useful in the polymerization of ethylenically unsaturated monomers, especially vinyl chloride and diethylene glycol bis (allyl carbonate), and an improved polymerization process.

The utility of peroxydicarbonate compounds for initiation of polymerization reactions has been known for a substantially long period of time. One may refer to, for example, U.S. Pat. No. 2,370,588 which discloses generally a class of peroxydicarbonate compounds useful as initiators. One may also refer to U.S. Pat. No. 3,799,916 which relates to peroxydicarbonates including peroxydicarbonates which are asymmetrical in nature, containing both an ethyl or ethenyl group and a tertiary-butyl group. However, no working example in the patent actually refers to the preparation of such an asymmetrical peroxydicarbonate.

Peroxydicarbonates, particularly diisopropyl peroxydicarbonate, have become important initiators especially with respect to the polymerization of vinyl chloride to form polyvinyl chloride and the polymerization of diethylene glycol bis (allyl carbonate), to form a polymer which is customarily known in the trade as CR-39, which is suitable for use in making plastic lenses for eye glasses. Problems associated with diisopropyl peroxydicarbonate include the fact that it is a solid material, rendering it difficult to handle, and the fact that it is unstable, requiring storage at $-18°$ C.

There has, therefore, existed a need for initiator compositions to replace diisopropyl peroxydicarbonate, preferably having better physical properties and/or better safety characteristics.

SUMMARY OF THE INVENTION

It has now been discovered that certain compositions comprising asymmetrical peroxydicarbonates are suitable for the polymerization of ethylenically unsaturated monomers or mixtures thereof. Generally, there has been discovered a composition comprising from about 25 to about 70 molar percent of an asymmetrical peroxydicarbonate of the formula

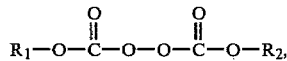

from about 15 to about 45 molar percent of a first symmetrical peroxydicarbonate of the formula

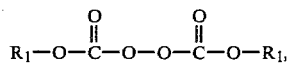

and from about 15 to about 45 molar percent of a second symmetrical peroxydicarbonate of the formula

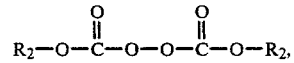

wherein $R_1$ and $R_2$ are different and selected from the group consisting of alkyl and alkenyl radicals having from about 3 to about 10 carbon atoms.

In another aspect of the present invention there has been discovered a method for polymerizing ethylenically unsaturated monomers, or a mixture of said monomers, comprising contacting said monomers or mixture, under free-radical initiating conditions with an effective amount of a composition comprising from about 25 to about 70 molar percent of an asymmetrical peroxydicarbonate of the formula

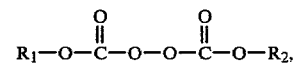

from about 15 to about 45 molar percent of a first symmetrical peroxydicarbonate of the formula

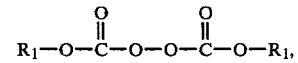

and from about 15 to about 45 molar percent of a second symmetrical peroxydicarbonate of the formula

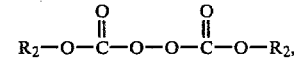

wherein $R_1$ and $R_2$ are different and selected from the group consisting of alkyl and alkenyl radicals having from about 3 to about 10 carbon atoms.

DETAILED DESCRIPTION OF THE PREFERRED EMBODIMENTS

As indicated, the present invention relates, in part, to novel compositions which comprise an asymmetrical peroxydicarbonate of the formula

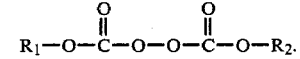

$R_1$ and $R_2$ may be selected from the group consisting of alkyl and alkenyl radicals having from about 3 to about 10 carbon atoms. Typical of the radicals from which $R_1$ and $R_2$ may be selected are isopropyl, normal-propyl, sec-butyl, ethyl-hexyl, and tertiary-butyl-cyclohexyl.

The synthesis of the compositions of the present invention may be achieved by employing known techniques for the manufacture of symmetrical peroxydicarbonates. Thus, to a suitable reaction vessel there may be charged $K_2CO_3$ and KOH with crushed ice added directly until the temperature of the reaction mixture drops to approximately 10° C., or lower. At that point hydrogen peroxide may be added with the temperature maintained at 10° C. or lower. Subsequently, the chloroformate counterparts for the desired symmetrical and asymmetrical peroxydicarbonates may be added to the reaction mixture.

Thus, if it is desired, for example, to obtain the asymmetrical peroxydicarbonate, isopropyl-sec-butyl peroxydicarbonate and the two corresponding symmetrical peroxydicarbonates in statistical distribution, one would premix approximately equal molar quantities of sec-butyl chloroformate and isopropyl chloroformate. After addition of the chloroformates the pH of the reaction mixture should be is analyzed and, if necessary, additional KOH may be added to maintain the pH at about 8.6 to about 9.2. The reaction mixture should then be allowed to separate into two layers and the aqueous phase should be withdrawn. Cold sodium chloride solution may be added and the mixture allowed to again separate. Analysis $Na_2SO_4$ and $MgSO_4$ may then be added to dry the organic layer and the salts removed by filtration. The resulting reaction mixture then contains the desired products.

If equal molar quantities of two chloroformates are reacted, one obtains a statistical distribution of products which, depending upon reactivities, will be approximately two moles of asymmetrical product and one mole of each of the symmetrical products. Thus, by reacting a mixture of two moles of sec-butyl chloroformate with two moles of isopropyl chloroformate one would expect to obtain approximately two moles of isopropyl-sec-butyl peroxydicarbonate, one mole of di-sec-butyl peroxydicarbonate, and one mole of diisopropyl peroxydicarbonate.

Of course, it may be considered to be desirable to obtain a mixture of symmetrical and asymmetrical peroxydicarbonates containing a larger proportion of symmetrical peroxydicarbonates. A facile method for obtaining such a mixture is simply to react the chloroformates in unequal molar quantities so that the chloroformate in molar excess reach to form a larger percentage of symmetrical peroxydicarbonate. Certainly one may simply blend additional symmetrical peroxydicarbonate with a reaction mixture obtained from reacting equal molar quantities of two different chloroformate in order to obtain the desired higher concentration of symmetrical peroxydicarbonate.

The compositions of the present invention may be used to polymerize ethylenically unsaturated monomers or mixtures thereof. An especially suitable monomer is vinyl chloride which may be homopolymerized or copolymerized. Typically, vinyl chloride may be copolymerized with up to about 15% of another ethylenically unsaturated monomer. Examples of monomers which are co-polymerizable with vinyl chloride include vinylidene chloride, ethylene, propylene, and vinyl acetate. Polymerization of the vinyl chloride is accomplished by contacting the vinyl chloride monomer or mixtures of monomers with an initiating amount of the composition of the present invention, under free-radical initiating conditions. Generally, from about 0.02 to about 0.06 weight percent of the compositions of the present invention, based upon the total weight of monomer, will be suitable for initiation of the polymerization.

The polymerization process of the instant invention is also suitable for use with diethylene glycol bis (allyl carbonate) monomer, which is also known commercially in its monomeric form as allyl diglycol carbonate. From a commercial standpoint, the most widely used initiator for allyl diglycol carbonate is diisopropyl peroxydicarbonate.

The preferred initiator composition of the present invention which contains from about 25 to about 70 molar percent, preferably about 50 molar percent, of isopropyl-sec-butyl-peroxydicarbonate, from about 15 to about 45 molar percent, preferably about 25 molar percent, of diisopropyl peroxydicarbonate, and from about 15 to about 45 molar percent, preferably about 25 molar percent, of di-sec-butyl peroxydicarbonate has several distinct advantages over diisopropyl peroxydicarbonate alone. The preferred composition of the instant invention is liquid, rather than solid, as is diisopropyl peroxydicarbonate, rendering the composition much easier to handle in the polymerization process. Moreover, the preferred composition of the present invention containing the asymmetric isopropyl-sec-butyl peroxydicarbonate posesses certain distinct safety advantages over diisopropyl peroxydicarbonate.

The preferred composition containing isopropyl-sec-butyl peroxydicarbonate requires a substantially longer time to ignite in a standardized burning test than either diisopropyl peroxydicarbonate or di-sec-butyl peroxydicarbonate. Secondly, the composition containing the asymmetric compound decomposes in a standard Rapid Heat Test at a temperature which is 16° C. higher than the corresponding temperature for isopropyl peroxydicarbonate and 6° higher than the decomposition temperature for di-sec-butyl peroxydicarbonate. Finally, a standardized Pressure Vessel Test (PVT) has indicated that diisopropyl peroxydicarbonate has a PVT number of 4.0 to 4.5 mm., and di-sec-butyl peroxydicarbonate has a PVT number of 12.0 mm., whereas the preferred composition of the present invention has a PVT number of 4.0 mm. Such improved safety characteristics render the preferred composition very desirable from both a handling and a processing viewpoint.

The invention will be further described in the following non-limiting examples.

EXAMPLE 1

To a solution of 201.8 grams of 40% $K_2CO_3$ and 46.9 grams of 45% KOH sufficient ice was added to cool the solution to 8° C. Subsequently, 30.9 grams of 50% $H_2O_2$ were added while maintaining the temperature at 8° C. or below. To the cold solution there was slowly added a solution containing 58.1 grams of secondary butyl chloroformate and 52.2 grams of isopropyl chloroformate, over a period of about 30 minutes, maintaining the temperature below 8° C. After the addition, the resulting solution was stirred for 30 minutes at a temperature of 8°-10° C., while maintaining the pH at 8.6-9.2 by small additions of 45% KOH.

The agitation was stopped and the aqueous layer was separated from the organic layer. To the organic layer was added 120 grams of a 25% NaCl solution with stirring for 10 minutes. The stirring was then stopped and the lower aqueous layer removed. The upper, organic layer was dried by the addition of 3 gram of anhydrous $Na_2SO_4$ and 3 grams of $M_gSO_4$. The salts were removed by filtration and the dried product was weighed and analyzed for active oxygen, residual chloride and peroxydicarbonate species. Utilizing thin layer chromatography, the product mixture was separated into its component peroxides and found to contain a mixture of 27% di-sec-butyl peroxydicarbonate, 22.8% diisopropyl peroxydicarbonate, and 50.2% sec-butyl-isopropyl peroxdicarbonate, and had 7.3% active oxygen and less than 0.05% chloride. A total of 79.4 grams of the product was recovered. HPLC, high pressure liquid chromatography, may also be used to separate these mixtures.

EXAMPLES 2-5

Utilizing the procedure of Example 1, compositions containing the asymmetrical peroxydicarbonates, normal-propylisopropyl peroxydicarbonate (Example 2), sec-butyl-normal-propyl peroxydicarbonate (Example 3), 2-ethyl hexyl-4-tertiary-butyl cyclohexyl peroxydicarbonate (Example 4), and 2-ethyl hexylisopropyl peroxydicarbonate (Example 5), were synthesized utilizing the quantities of reactants shown in the Table, which also contains the results of the analysis for the products of the Examples.

All of the compositions of Examples 2-4 were liquids but thin layer chromatography could not be used to separate the products according to their molecular structure.

The product of Example 5 was separated by the use of thin layer chromatography and was found to contain 32 percent of the asymmetrical (ethyl-hexyl)-isopropyl peroxydicarbonate, 22 percent of diisopropyl peroxydicarbonate, and 46 percent of di-(ethyl-hexyl) peroxydicarbonate.

TABLE

| Example No. | 2 | 3 | 4 | 5 |
|---|---|---|---|---|
| grams 40% $K_2CO_3$ | 217. | 78.8 | | |
| grams 45% KOH | 7.7 | 57.4 | 114.5 | 14.8 |
| grams 50% $H_2O_2$ | 23.1 | 27.4 | 33.8 | 33.8 |
| grams 4-tertiary-butyl cyclohexyl chloroformate | | | 85.2 | |
| grams n-propyl chloroformate | 40. | 35.9 | | |
| grams ethyl hexyl chloroformate | | | 75.2 | 75.2 |
| grams i-propyl chloroformate | 40. | | | 56.4 |
| grams sec-butyl chloroformate | | 40.0 | | |
| ml. 25% NaCl solution | 130. | 90. | 120 | 120 |
| grams $Na_2SO_4$ | | 2.0 | 3.0 | 3.0 |
| grams $MgSO_4$ | 5 | 2.0 | 3.0 | 3.0 |
| Temperature | −5 to 0° C. | −5 to 0° C. | 8–10° C. | <8° C. |
| pH | 8.5–9.0 | 8.6–9.2 | 12.5–13 | 12.5–13.0 |
| Product Analysis: | | | | |
| grams recovered | 57.6 | 50. | 142 | 76 |
| % active oxygen | 7.75% | 7.25 | 3.59 | 5.30 |
| % assay | 99.8% | 99.7 | 83.6 | 93.8 |
| % Chloride | 0.05% | <0.05 | 16.0 | <0.05 |

The products were all liquids. The products of examples 2,3 and 4 were not separated by thin layer chromatography.

EXAMPLE 6

Utilizing typical free-radical initiating polymerization techniques, a vinyl chloride monomer was polymerized in a suitable vessel at a temperature of 55° C. Ten pounds of vinyl chloride was initiated with 0.037 percent, by weight, of the composition of Example 1 containing the asymmetric peroxydicarbonate, isopropyl-sec-butyl-peroxydicarbonate. The reaction mixture was stirred at about 350 rpm and the polymerization reaction was allowed to continue for 5¼ hours from the time a pressure drop in the reactor from about 150 to about 120 p.s.i. was observed. An 89% conversion of the vinyl chloride was obtained.

As a comparison, the same polymerization techniques were employed, but using 0.039 percent of diisopropyl peroxydicarbonate as the initiator. An 85% conversion of the vinyl chloride was obtained.

What is claimed is:

1. A method for polymerizing ethylenically unsaturated monomers, or a mixture of said monomers, comprising contacting said monomers or mixture under free-radical initiating conditions with an effective amount of a composition comprising from about 25 to about 70 molar percent of an asymmetrical peroxydicarbonate of the formula

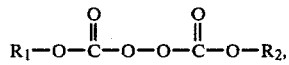

from about 15 to about 45 molar percent of a first symmetrical peroxydicarbonate of the formula

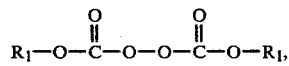

and from about 15 to about 45 molar percent of a second symmetrical peroxydicarbonate of the formula

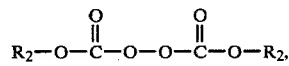

wherein $R_1$ is isopropyl and $R_2$ is sec-butyl.

2. The method of claim 1 wherein the ethylenically unsaturated monomer is vinyl chloride.

3. The method of claim 1 wherein the ethylenically unsaturated monomer is diethylene glycol bis (allyl carbonate).

4. The method of claim 1, 2, 3 wherein the composition comprises about 50 molar percent of isopropyl-sec-butyl peroxydicarbonate, about 25 molar percent of diisopropyl peroxydicarbonate, and about 25 percent of di-sec-butyl peroxydicarbonate.

* * * * *